(12) United States Patent
Tripathi

(10) Patent No.: US 11,087,275 B2
(45) Date of Patent: Aug. 10, 2021

(54) SHELF INVENTORY MANAGEMENT SYSTEM

(71) Applicant: THE COCA-COLA COMPANY, Atlanta, GA (US)

(72) Inventor: Peeyush Tripathi, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 33 days.

(21) Appl. No.: 16/093,919

(22) PCT Filed: Apr. 12, 2017

(86) PCT No.: PCT/US2017/027220
§ 371 (c)(1),
(2) Date: Oct. 15, 2018

(87) PCT Pub. No.: WO2017/180752
PCT Pub. Date: Oct. 19, 2017

(65) Prior Publication Data
US 2019/0108474 A1      Apr. 11, 2019

Related U.S. Application Data

(60) Provisional application No. 62/322,846, filed on Apr. 15, 2016.

(51) Int. Cl.
*G06Q 10/08*       (2012.01)
*G01L 1/20*         (2006.01)
(Continued)

(52) U.S. Cl.
CPC ........... *G06Q 10/087* (2013.01); *G01B 21/20* (2013.01); *G01L 1/205* (2013.01); *G01L 1/22* (2013.01);
(Continued)

(58) Field of Classification Search
CPC ............. G06Q 10/087; G06Q 10/0875; G06Q 10/06311; G06Q 20/203; G06Q 30/0629
See application file for complete search history.

(56) References Cited

U.S. PATENT DOCUMENTS 5,125,362 A * 6/1992 Erickson ................ A01K 31/16
                                                                            119/329
6,069,696 A      5/2000 McQueen et al.
(Continued)

FOREIGN PATENT DOCUMENTS

WO        20140209724 A1    12/2014

OTHER PUBLICATIONS

Definition of 'planogram' at https://www.merriam-webster.com/dictionary/planogram (1986).*
(Continued)

*Primary Examiner* — Peter Ludwig

(57) ABSTRACT

Technologies are described herein for converting the output of a pressure sensitive mat into an image and processing the image to identify the products present on the mat. An example system includes a processor configured to read pressure values from the plurality of pressure sensors on the pressure sensitive mat and generate an image with each pixel in the image encoding a value corresponding to a pressure value read from the pressure sensitive mat. A server may be configured to receive the image from the processor and process the image to identify one or more types of products that may be present on the pressure sensitive mat for each product package detected to be present on the pressure sensitive mat based on a combination of two or more of a shape of the product package, one or more dimensions of the product package, or a weight of the product package.

9 Claims, 6 Drawing Sheets

(51) Int. Cl.
  *G01B 21/20* (2006.01)
  *G06K 9/20* (2006.01)
  *G06T 7/62* (2017.01)
  *G01L 1/22* (2006.01)
(52) U.S. Cl.
  CPC .......... *G06K 9/2009* (2013.01); *G06K 9/209* (2013.01); *G06T 7/62* (2017.01); *G06T 2207/30128* (2013.01)

(56) References Cited

U.S. PATENT DOCUMENTS

| | | | | |
|---|---|---|---|---|
| 7,233,241 | B2* | 6/2007 | Overhultz | A47F 10/02 211/59.2 |
| 8,766,925 | B2* | 7/2014 | Perlin | G06F 3/0233 345/173 |
| 9,753,591 | B2* | 9/2017 | Bui | G06F 1/1632 |
| 10,222,279 | B1* | 3/2019 | Legrand, III | G01L 1/142 |
| 10,384,869 | B1* | 8/2019 | Shiee | G06Q 10/087 |
| 10,504,230 | B1* | 12/2019 | Stahl | G06Q 10/087 |
| 2004/0253861 | A1* | 12/2004 | Schubert | H01H 3/141 439/206 |
| 2006/0071774 | A1* | 4/2006 | Brown | G07F 9/026 340/522 |
| 2007/0069867 | A1* | 3/2007 | Fleisch | G06Q 10/087 340/309.16 |
| 2008/0083416 | A1* | 4/2008 | Xia | A61B 5/1036 132/200 |
| 2009/0059270 | A1 | 3/2009 | Opalach et al. | |
| 2009/0221338 | A1* | 9/2009 | Stewart | A63F 13/214 463/7 |
| 2012/0198949 | A1* | 8/2012 | Xia | A43D 1/02 73/865.8 |
| 2014/0003729 | A1* | 1/2014 | Auclair | G06Q 10/087 382/224 |
| 2014/0090489 | A1* | 4/2014 | Taylor | G01L 1/00 73/862.626 |
| 2014/0367466 | A1 | 12/2014 | Pai et al. | |
| 2015/0019391 | A1 | 1/2015 | Kumar et al. | |
| 2016/0026032 | A1* | 1/2016 | Moore | G02F 1/13452 382/103 |
| 2016/0048798 | A1* | 2/2016 | Meyer | G01G 19/4144 705/28 |
| 2016/0283898 | A1* | 9/2016 | Reuther | G06Q 10/087 |
| 2017/0089775 | A1* | 3/2017 | Hsu | G01L 1/16 |
| 2017/0202630 | A1* | 7/2017 | Gerstner | F16M 13/027 |
| 2017/0234746 | A1* | 8/2017 | Cohen | G01L 1/205 73/1.08 |
| 2017/0344935 | A1* | 11/2017 | Mattingly | G06K 17/0022 |
| 2018/0165626 | A1* | 6/2018 | Davidson | G08B 21/182 |
| 2018/0165711 | A1* | 6/2018 | Montemayor | G06Q 30/0269 |
| 2019/0073627 | A1* | 3/2019 | Nakdimon | G06K 7/10425 |
| 2019/0078930 | A1* | 3/2019 | Ravulapati | G06F 3/1423 |

OTHER PUBLICATIONS

Desai, Apurva Mahendra (et al); Interpretation of Tactile Data From an FSR Pressure Pad Transducer Using Image Processing Techniques; Nov. 1, 1994; pp. 1-157; Simon Fraser University; Burnaby, Canada.

Schneider, Alexander (et al); Object identification with tactile sensors using bag-of-features; Intelligent Robots and Systems, 2009, IEEE/RSJ International Conference on, Oct. 10, 2009, pp. 243-248, IEEE, Piscataway, USA.

Pezzementi, Zachary et al; Object mapping, recognition, and localization from tactile geometry, Robotics and Automation (ICRA), 2011 IEEE, International Conference on, May 9, 2011, pp. 5942-5948, IEEE, Shanghai, China.

Mitzel, Dennis; European Search Report, dated Oct. 17, 2019, pp. 1-11, The Hague, Netherlands.

Nho, Ji Myong; International Search Report & Written Opinion; dated Aug. 7, 2018; pp. 1-14; Korean Intellectual Property Office, Daejeon, Republic of Korea.

\* cited by examiner

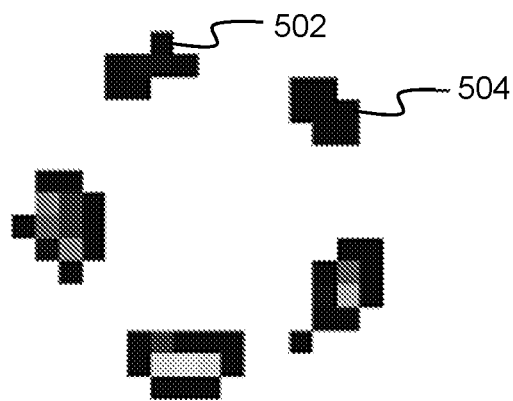
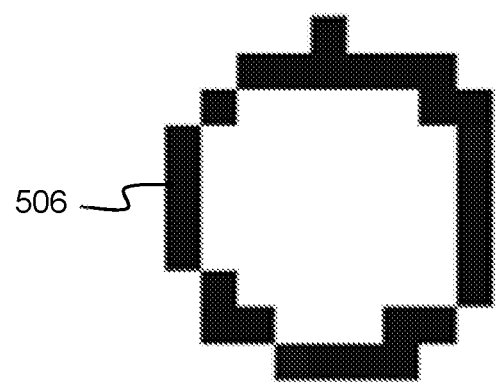
FIG. 5A    FIG. 5B
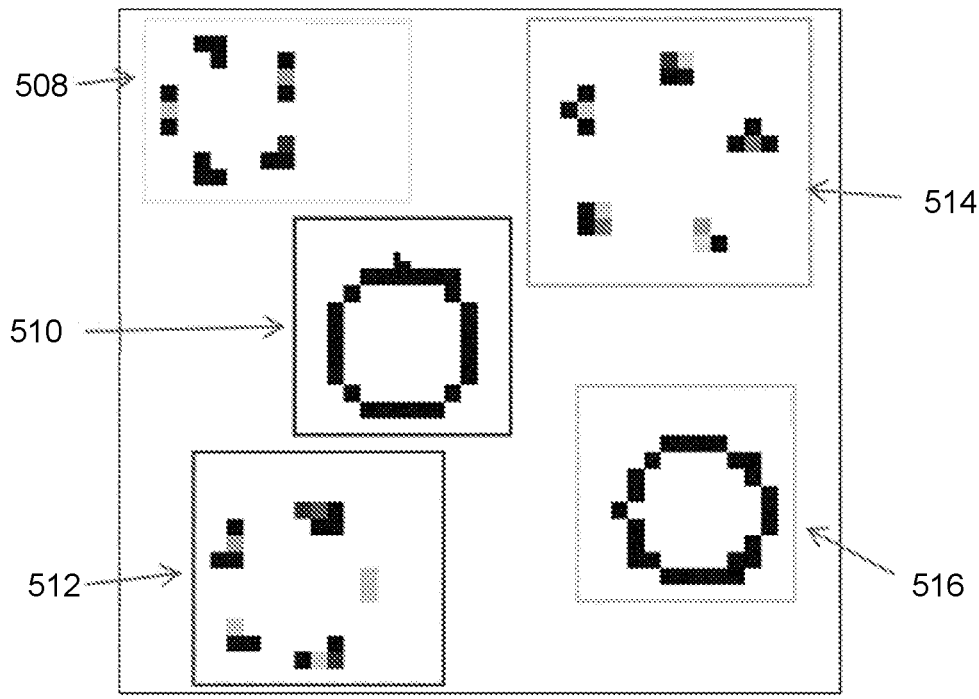
FIG. 5C

SHELF INVENTORY MANAGEMENT SYSTEM

CROSS-REFERENCE TO RELATED APPLICATIONS

This patent application claims priority to U.S. Patent Application Ser. No. 62/322,846, filed Apr. 15, 2016, entitled "Shelf Inventory Management System and Method" of which the disclosure is incorporated herein, in its entirety, by reference.

TRADEMARKS

COCA-COLA® is a registered trademark of The Coca-Cola Company, Atlanta, Ga., U.S.A. Other names, symbols, designs, or logos used herein may be registered trademarks, trademarks, or product names of The Coca-Cola Company or other companies.

FIELD OF THE INVENTION

This application and resulting patent relates to determining an inventory of products on a shelf, and in particular, relates to systems and methods for converting the output of a pressure sensitive mat into an image and processing the image to identify the products present on the mat.

BACKGROUND

Conventional merchandise display shelving arrangements with shelves at several levels, like "gondola" shelving, are commonly used in grocery stores and other such outlets. Ensuring proper merchandising of products and maintaining appropriate stock levels within these shelving arrangements facilitates maximizing sales opportunities. Inventorying of products on the shelving systems typically requires a visual inspection of shelves. While some applications may facilitate expediting the inventorying process, such as through the use of using machine vision with an application on a mobile device, such applications still require the presence of personnel to execute the application. Accordingly, the inventorying process may only take place while personnel are present and the shelving arrangements may not be maintained at optimal stock and merchandising configurations.

SUMMARY

The techniques discussed herein facilitate an automatic inventory management system. As described herein, various methods and systems for determining an inventory of products on a shelf by converting the output of a pressure sensitive mat into an image and processing the image to identify the products present on the mat are provided.

According to one example, a system comprises a pressure sensitive mat with a grid of a plurality of pressure sensors. A local processor may be configured to read pressure values from the plurality of pressure sensors on the pressure sensitive mat and generate an image. Each pixel in the image may encode a value corresponding to a pressure value read from the pressure sensitive mat. A remote server may be configured to receive the image from the local processor and process the image to identify one or more types of products that may be present on the pressure sensitive mat for each product package detected to be present on the pressure sensitive mat based on a combination of two or more of a shape of the product package, one or more dimensions of the product package, or a weight of the product package.

In some examples, the value of each pixel is encoded at a pixel location within the image corresponding to a corresponding pressure sensor location within the grid on the pressure sensitive mat.

In some examples, the local processor is configured to read the pressure values in response to a trigger or on a scheduled basis.

In some examples, the local processor is in direct communication with the pressure sensitive mat to read the pressure values.

In some examples, the local processor is further configured to communicate the image to the remote server over a network.

In some examples, the server is further configured to determine a type of the product package based on the shape of the product package.

In some examples, the one or more types of products are beverage products and the product package is a beverage package.

In some examples, the server is further configured to deduce a unique product that is present on the pressure sensitive mat for each product package detected to be present on the pressure sensitive mat based on a comparison between the one or more types of products that may be present on the pressure sensitive mat and a planogram of a shelf where the pressure sensitive mat is located.

In some examples, the server is further configured to compare a current inventory of products determined to be present on the pressure sensitive mat to a planogram for a shelf where the pressure sensitive mat is located to determine an amount of products needed to fill the shelf according to the planogram.

In some examples, the server is further configured to communicate a notification to an inventory management system based on the identified products on the pressure sensitive mat.

According to another example, an apparatus comprises a processor and a non-transitory computer-readable storage medium having instructions stored thereupon which are executable by the processor. When the instructions are executed, they cause the processor to execute an application configured to receive an image, the image comprising an array of pixels with each pixel encoding a value corresponding to a pressure value read from a pressure sensor on a pressure sensitive mat. The application is also configured to process the image to determine a shape of a product package present on the pressure sensitive mat, one or more dimensions of the product package, and a weight of the product package. The application is further configured to identify one or more types of products for the product package based on the shape, the one or more dimensions, and the weight of the product package.

In some examples, the value of each pixel is encoded at a pixel location within the image corresponding to a corresponding pressure sensor location within a grid of pressure sensors on the pressure sensitive mat.

In some examples, the image is received in response to a trigger or is received on a scheduled basis.

In some examples, the application is further configured to determine a type of the product package based on the shape of the product package.

In some examples, the one or more types of products are beverage products and the product package is a beverage package.

In some examples, the application is further configured to deduce a single type of product for the product package present on the pressure sensitive mat based on a comparison between the one or more types of products that may be present on the pressure sensitive mat and a planogram of a shelf where the pressure sensitive mat is located.

In some examples, the application deduces the single type of product for the product package present on the pressure sensitive mat when there is agreement between the planogram and one of the one or more types of products that may be present on the pressure sensitive mat.

In some examples, the application is further configured to compare a current inventory of products determined to be present on the pressure sensitive mat to a planogram for a shelf where the pressure sensitive mat is located to determine an amount of products needed to fill the shelf according to the planogram.

In some examples, the application is further configured to communicate a notification to an inventory management system based on the identified products on the pressure sensitive mat.

The above-described subject matter may also be implemented in other ways, such as a computer-controlled apparatus, a computer process, a computing system, or as an article of manufacture such as a computer-readable storage medium, for example. Although the technologies presented herein are primarily disclosed in the context of mobile applications, the concepts and technologies disclosed herein are also applicable in other forms including deployment of applications for a variety of platforms. Other variations and implementations may also be applicable. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. The same reference numbers in different figures indicate similar or identical items.

FIGS. 5A-5D are diagrams illustrating 2D images generated by the local reader/processor upon reading one or more pressure sensitive mats, in one configuration presented herein;

DETAILED DESCRIPTION

As used herein, the terms "product" and "beverage", and their pluralized forms, are used synonymously, and particular features of the invention should not be limited in scope by the use of either term.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

Figure 1:
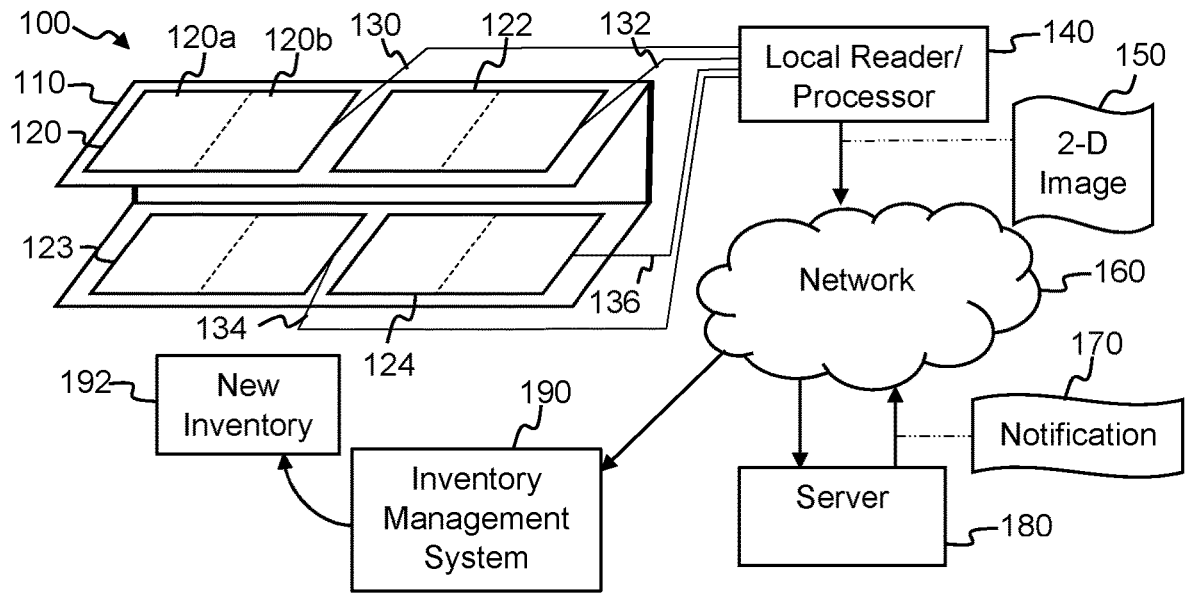
FIG. 1 is a system architecture diagram showing aspects of the configuration and operation of a shelf inventorying management system, in one configuration presented herein.

FIG. 1 illustrates a system architecture diagram showing aspects of the configuration and operation of a shelf inventorying management system 100, in one configuration presented herein. The shelf inventorying management system 100 includes one or more pressure sensitive mats 120, 122, 123, 124, a local reader/processor 140, a server 180, and an inventory management system 190. As described in detail below, the local reader/processor 140 reads pressure values from a pressure sensitive mat 120 on a display shelving 110 and generates a 2D image 150 that encodes the read pressure values. The 2D image 150 may then be communicated by the local reader/processor 140 over a network 160 to the server 180. The server 180 may execute one or more image processing applications to process the 2D image so as to identify the products present on the mat 120. The server 180 may also execute one or more image processing applications to compare a representation of the products and their location on the mat 120 to a planogram corresponding to the display shelving 110. The server 180 may then communicate a notification to an inventory management system 190 such that the correct amount of new inventory 192 is ordered and merchandised appropriately on the display shelving 110.

The display shelving 110 may include multiple shelves, where different pressure sensitive mats may be placed on different shelves. Moreover, each shelf may have one or more pressure sensitive mats. For example, as shown in FIG. 1, a top shelf of the display shelving 110 may include a mat 120 and a mat 122, whereas a bottom shelf of the display shelving 110 may include a mat 123 and a mat 124. While two mats are shown on each shelf, any number of mats may be present. In some embodiments, a single large mat may be placed on each shelf for detecting any products on that shelf. That is, the product display surface area of the shelf may be covered by a single mat.

Each pressure sensitive mat may have a communication pathway to the local reader/processor 140. For example, as shown in FIG. 1, mat 120 may have communication pathway 130 to the local reader/processor 140. Similarly, mat 122 may have communication pathway 132, mat 123 may have communication pathway 134, and mat 124 may have communication pathway 136.

In some embodiments, the communication pathway may be a wired connector between a respective mat and the local reader/processor 140, such as an analog connector, a serial port connector, a USB connector, or other such wired connector. While each mat 120, 122, 123, 124 is shown connecting to the local reader/processor 140 in parallel, it is contemplated that the mats 120, 122, 123, 124 may be serially connected to each other and the series connected to the local reader/processor 140. Similarly, each of the mats 120, 122, 123, 124 may be connected to a serial bus that is connected to the local reader/processor 140. Other connections and configurations may be used.

In some embodiments, the communication pathway may be a wireless connection between a respective mat and the local reader/processor 140, such as through NFC, Bluetooth, BLE, Wi-Fi, or other such near field or local area network wireless connection.

In some embodiments, each of the mats 120, 122, 123, 124 may have a power plug or other such power connection (not shown). Alternatively, the mats 120, 122, 123, 124 may be supplied with power via a wireless power transmission and storage system (not shown). As a further alternative, each of the mats may be powered via battery power. In embodiments where the mats are connected to the local reader/processor 140 via a wired connection, the local reader/processor 140 may supply power over the communication pathways to the mats 120, 122, 123, 124.

Each of the mats 120, 122, 123, 124 may be divided into two or more product detection zones. For example, mat 120 is shown to be divided into a first product detection zone 120a and a second product detection zone 120b. Each of the product detection zones may be associated with the placement of a different product. As discussed in more detail below, the product detection zones facilitate comparing what products are actually present on the mats 120, 122, 123, 124 to a planogram of desired product placement. One or more of the mats 120, 122, 123, 124 may be a dedicated product detection zone for a single product. Such mats may not be divided into more than one product detection zone. In some embodiments, the display shelving 110 may support one or more mats with a single product detection zone and one or more mats with more than one product detection zone.

As discussed in more detail below with FIG. 2, the local reader/processor 140 may read the pressure values from one or more of the pressure sensitive mats 120, 122, 123, 124 and generate one or more 2D images 150 that encode the read pressure values. In some embodiments, the local reader/processor 140 may generate a single image 150 for each mat. In some embodiments, the local reader/processor 140 may generate a single image 150 for each product detection zone. In some embodiments, the local reader/processor 140 may generate a single image 150 from multiple mats, such as an image for each shelf on a display shelving 110 or one image for the entire display shelving 110. The local reader/processor 140 may then communicate the generated 2D image(s) 150 over a wide area network (WAN), such as the internet, to a remote server 180 for processing.

The local reader/processor 140 may read the pressure sensitive mats 120, 122, 123, 124 and generate one or more 2D images 150 on a scheduled basis or in response to a trigger. The local reader/processor 140 may be configured to run before or after each of the peak consumption periods for an outlet. In a non-limiting example, the outlet may have peak consumption periods for purchasing the products on the display shelving such as at 8:30 am, 12:00 pm, and 5:30 pm. In this example, the local reader/processor 140 may be scheduled to run before each peak consumption period to ensure that the display shelving 110 is properly stocked ahead of the peak consumption period, such as at 8:00 am, 11:30 am, and 5:00 pm. Other times and schedules can be used. Alternatively, the local reader/processor 140 may be scheduled to run after each peak consumption period to account for the products sold during the peak consumption period and ensure that sufficient stock is available for the next peak consumption period.

The local reader/processor 140 may also or alternatively be configured to read the pressure sensitive mats 120, 122, 123, 124 and generate one or more 2D images 150 based on a received trigger. In a non-limiting example, the local reader/processor 140 may be configured to read the pressure sensitive mats 120, 122, 123, 124 and generate one or more 2D images 150 based on a local trigger, such as a button pressed on the local reader/processor 140 or a local message communicated to the local reader/processor 140. In another non-limiting example, the local reader may be configured to read the pressure sensitive mats 120, 122, 123, 124 and generate one or more 2D images 150 based on a remote trigger received over the network 160, such as from server 180. Such remote triggering may facilitate, for example, the server 180 to initiate inventorying the display shelving 110 prior to a delivery truck loading new inventory 192 for delivery to the outlet with the display shelving 110 so as to ensure the proper amount of new inventory 192 is delivered to the outlet.

The server 180 may process the received 2D image(s) 150 and identify which products are present on the pressure sensitive mats 120, 122, 123, 124. For each identified product, the server 180 may determine the shape, size, and weight of the product. Using this combination of information, the server 180 may positively identify each product present on the pressure sensitive mats 120, 122, 123, 124. In some embodiments, the server 180 may use the shape, size, and weight of the products to make a preliminary determination of one or more possible products present and correlate the preliminary determination with a planogram associated with the display shelving 110 to make a final determination of which products are present on the pressure sensitive mats 120, 122, 123, 124.

Based on the determination of which products are present on the pressure sensitive mats 120, 122, 123, 124, one or more notifications 170 may be communicated by the server 180. For example, a notification 170 may be communicated over the network 160 to an outlet owner or manager or other entity responsible for the merchandising of products on the display shelving 110 to adjust the placement of products present on the pressure sensitive mats 120, 122, 123, 124. In this example, the notification 170 may remind the outlet owner or manager to ensure that the products in a sold-down location are moved towards the end of the shelf to be more visible and accessible to consumers and thus improve the continued sales of those products.

In another example, a notification 170 may be communicated over the network 160 to an outlet owner or manager or other entity responsible for ordering new inventory 192 of the amount of products sold. For example, the notification 170 may be communicated to an inventory management system 190, such that an order for new inventory 192 includes an appropriate amount of each product to restock the display shelving 110. In a non-limiting example, the server 180 may compare the current inventory of products determined to be present on the pressure sensitive mats 120, 122, 123, 124 to a planogram for the shelving display 110 to determine an amount of products needed to fill the shelving display 110 according to the planogram. The determined amount of products needed to fill the shelving display 110 according to the planogram may be communicated in the notification 170 such that an order may include the appropriate amount of each product.

Alternatively or in addition to the above, the server 180 may compare the current inventory of products determined to be present on the pressure sensitive mats 120, 122, 123, 124 to a prior inventory of products determined to be present on the pressure sensitive mats 120, 122, 123, 124 to determine how many products have been sold between the current and prior inventory of products on the display shelving 110. Such time based comparisons of the actual inventory may be used to determine a consumption rate of the products on the display shelving 110. More than just the immediately prior inventory may be used in determining a consumption rate of products on the display shelving 110. Moreover, day-parts can be used to determine the consumption rate of products on the display shelving 110 for different parts of the day, such as the morning consumption rate, the mid-day consumption rate, and the evening consumption rate. Other day-parts may be used.

Based on the determined consumption rate of products, a projected amount of sold inventory may be communicated in the notification 170 such that an order may include an appropriate amount of each product in the next projected new inventory 192 delivery. Alternatively or in addition to the projected amount of sold inventory, the notification 170 may also include the determined consumption rate. The notification 170 may also include other information, such as the 2D image(s) used to determine which products are present on the mats 120, 122, 123, 124, an indication of which products the server 180 determined were present, a total number of each type of product determined to be present on the mats 120, 122, 123, 124, or any other information received or used by the server 180. The notification 170 may also include an error report identifying any discrepancies between the determination of one or more possible products present and a planogram associated with the display shelving 110. For example, the error report in the notification 170 may indicate that a regular soft drink in a plastic bottle is present on the pressure sensitive mat 120 at a location in the planogram where a diet soft drink in a can should be located.

Figure 2:
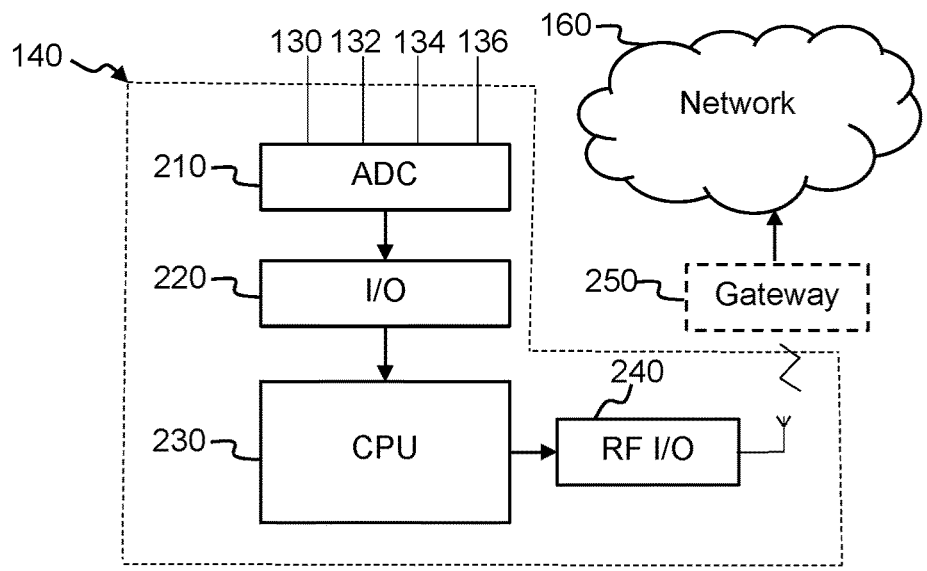
FIG. 2 is a diagram illustrating aspects of the operation of a local reader/processor of the automatic inventorying system, in one configuration presented herein.

FIG. 2 is a diagram illustrating aspects of the configuration of a local reader/processor 140 of the shelf inventorying management system 100, in one configuration presented herein. The local reader/processor 140 may include an analog-to-digital converter (ADC) 210, an input/output (I/O) interface 220, a central processing unit (CPU) 230, and a radio frequency (RF) I/O 240. The ADC 210 may convert the pressure values from the pressure sensitive mats 120, 122, 123, 124 to digital values. Locating the ADC 210 at the local reader/processor 140 minimizes the amount of hardware required on the pressure sensitive mats 120, 122, 123, 124, thus minimizing the cost of the shelf inventorying management system 100. In some embodiments, the ADC 210 may be located on each mat such that digital values may be read directly from the pressure sensitive mats 120, 122, 123, 124. The digital values may be read via an input/output (I/O) interface 220 and processed by the CPU 230 to generate 2D image(s) 150 that encode the pressure values read from one or more of the pressure sensitive mats 120, 122, 123, 124. As discussed in more detail below, each pressure value read from a pressure sensor on one of the pressure sensitive mats 120, 122, 123, 124 may be converted to a pixel value in the 2D image 150, where a grayscale or color value of the pixel in the 2D image encodes the pressure value from the pressure sensor of the corresponding pressure sensitive mat.

The CPU 230 may communicate the generated 2D image(s) 150 via the RF I/O 240 over the network 160 to the server 180. For example, the RF I/O 240 may be a wireless modem for communicating data via a cellular telephone network to the server 180. In some embodiments, the RF I/O 240 may be in communication with a communications gateway 250 present at the outlet with the display shelving 110. The gateway 250 may be a wireless router with access to the Internet or other such communications network for communicating the 2D image(s) 150 to the server 180. While shown as an RF I/O 240, in some embodiments, the local reader/processor 140 may be in communication with the gateway 250 via a wired connection, such as USB, Ethernet, or other wired communication standard. Other configurations of the local reader/processor 140 may be used.

Figure 3:
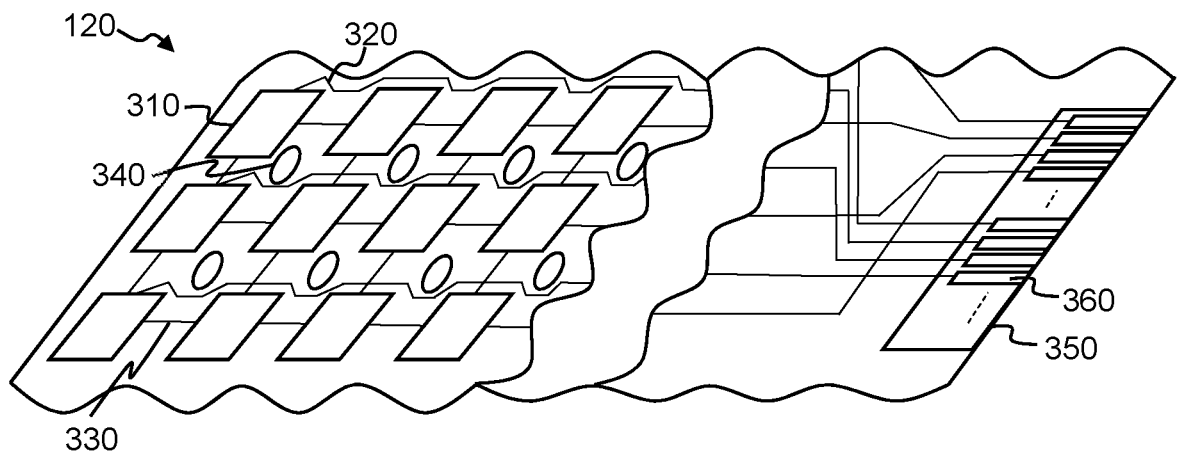
FIG. 3 is a diagram illustrating aspects of the configuration of a pressure sensitive mat, in one configuration presented herein.

FIG. 3 is a diagram illustrating aspects of the configuration of a pressure sensitive mat 120, in one configuration presented herein. The pressure sensitive mat 120 may include a grid of pressure sensors 310, wire lead 320, wire lead 330, connector 350, and connector pins 360. The pressure sensors 310 may be any pressure sensor such as a strain gauge, force resistor, or other such pressure sensor. The pressure value generated by the pressure sensor 310 may be read from the pressure sensitive mat 120 via one or more wire leads 320, 330 to connector pins 360 on the connector 350. As discussed above, alternative configurations of the pressure sensitive mat 120 may be used. For example, an ADC 210 may be included on the mat and the pressure sensors 310 may be read and converted by the ADC 210 to digital values which may then be communicated via a digital communication path to the local reader/processor 140. In some embodiments, the pressure sensitive mat 120 may include a grid of holes 340, where a wire lead 320 may be laid out around each of the holes 340. The holes 340 may facilitate placement of the pressure sensitive mat 120 on a shelf within a temperature controlled compartment such as a cooler. The holes 340 may facilitate air flow through the pressure sensitive mat 120 to facilitate proper cooling of the products placed upon the pressure sensitive mat 120. Other configurations of the pressure sensitive mat 120 may be used.

Figure 4A:
FIGS. 4A-4D are diagrams illustrating the variety of shapes and sizes of the shelf contacting surface of product packaging, in one configuration presented herein.
Figure 4B:
Figure 4C:
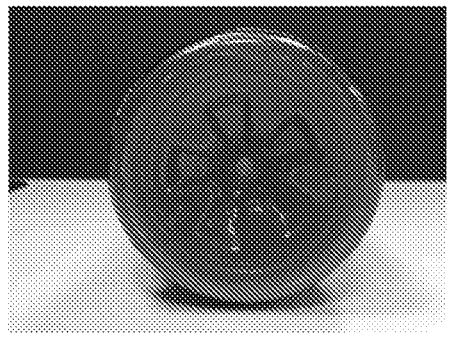
Figure 4D:
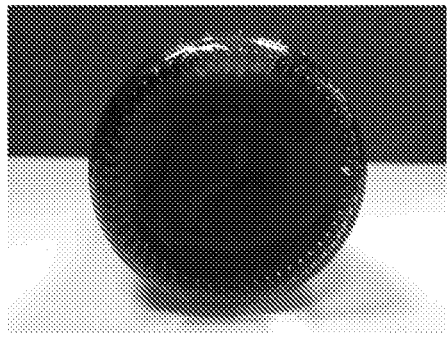

FIGS. 4A-4D are diagrams illustrating the variety of shapes and sizes of the shelf contacting surface of product packaging, in one configuration presented herein. For example, as shown in FIG. 4A, the shelf contacting surface of a plastic bottle product packaging may have a petaloid shape with a plurality of distinct shelf contacting surfaces, five in the example shown. FIG. 4B shows the shelf contacting surface of an aluminum can product packaging that may have a contiguous circular shelf contacting surface. FIG. 4C shows the shelf contacting surface of a hot-fill plastic bottle that may also have a contiguous circular shelf contacting surface. FIG. 4D shows the shelf contacting surface of a glass bottle that may also have a circular shelf contacting surface with ridges at regular intervals. While the shelf contacting surface shapes of the packaging in FIGS. 4B-4D are all circular shapes, differences in the shapes may facilitate positive identification of the type of packaging upon processing the 2D image 150 by the server 180. For example, the shelf contacting surface of the packaging in FIG. 4B is a narrow circle with a smaller diameter than that of the shelf contacting surface of the packaging in FIG. 4C. As such, the shelf contacting surface of the packaging shown in FIG. 4C may interact with more pressure sensors 310 on the pressure sensitive mat 120 than the packaging shown in FIG. 4B. The shelf contacting surface of the packaging in FIG. 4D is also a narrow circle, but has a larger diameter than that of the packaging shown in FIG. 4B. Depending on the resolution of the pressure sensitive mat 120, the ridges on the packaging shown in FIG. 4D may also be detected. Differences in the radius or other dimensions of the shelf contacting surface of the packaging may also facilitate detecting the size of the package. For example, a 12 fl. oz. aluminum can may have a 1 inch radius circular shelf contacting surface whereas a 16 fl. oz. aluminum can may have a 1.2 inch radius circular shelf contacting surface. In another example, a 20 fl. oz. plastic bottle may have a 1 inch radius petaloid shelf contacting surface whereas a 1 liter plastic bottle may have a 1.5 inch radius petaloid shelf contacting surface. Other dimensions may be used, such as the packaging diameter, circumference, surface area of contact, etc. The server 180 may process the 2D image 150 to detect the shape and one or more dimensions of the packaging present on the pressure sensitive mat 120 and determine which type and size of packaging is present on the pressure sensitive mat 120.

FIGS. 5A-5D are diagrams illustrating 2D images 150 generated by the local reader/processor 140 upon reading one or more pressure sensitive mats, in one configuration presented herein. As discussed above, each pixel in the 2D image 150 encodes the pressure value read from a corresponding pressure sensor on the pressure sensitive mat 120. For example, an eight bit grayscale image pixel value may be on a range from 0-255 where each of the values correspond to a different pressure value. If additional resolution is required, then color image pixel values may be used to encode a broader range of pressure values. For example, the red, blue, and green components of an RGB pixel value may each encode a different resolution of pressure values. For example, the red component of an 8 bit RGB pixel value may encode a course level of pressure values, the blue component of an 8 bit RGB pixel value may encode a medium level of pressure values, and the green component of an 8 bit RGB pixel value may encode a fine level of pressure values. The sum of the pressure values encoded in each of the red, blue, and green components of the RGB pixel may provide the total pressure value for the pixel location. Alternatively, the red, blue, and green components of the RGB pixel may be joined together in a single bit sequence that encodes the pressure value. For example, for an 8 bit RGB pixel value, the 8 bits of each of the red, blue, and green components of the RGB pixel may be joined together in a 24 bit sequence that encodes the pressure value. Other grayscale or color encodings of the pressure values into pixel values may be used. Other color models may be used for color encodings of the pressure values, such as CMYG. Moreover, other resolutions of image pixels may be used, such as 16 bit or 32 bit pixels.

Each pixel in the 2D image 150 also encodes the location of the pressure sensor on the pressure sensitive mat 120. For example, two adjacent pixels in the 2D image correspond to two adjacent pressure sensors 310 on the pressure sensitive mat 120. Because the sensor pitch between adjacent pressure sensors 310 on the pressure sensitive mat 120 is known, the distance between pixels in the 2D image 150 may be determined. For example, if the pressure sensor pitch on the pressure sensitive mat 120 is 1 mm, then the distance encoded between each of the pixels on the 2D image is 1 mm. Therefore, the server 180 may process the 2D image 150 to determine the distance between two pixel locations on the 2D image 150. Such determinations may be used for calculating the dimensions of the packaging present on the pressure sensitive mat 120, as discussed in more detail below.

FIG. 5A illustrates the pattern of pixels within the 2D image 150 for a package with a petaloid shaped shelf contact surface. Each of the distinct petaloids may form a contiguous set of pixels with non-zero encoded pressure values (e.g., non-white pixels) that do not enclose any pixels with a zero encoded pressure value (e.g., white pixels). Continuity between pixels may be based on any non-white pixels being present on any of the sides or diagonals of another non-white pixel. Other definitions of continuity may be used to define distinct petaloid shaped shelf contact surfaces such that the server 180 may process the 2D image 150 to identify packaging with a petaloid shaped shelf contact surface.

In FIG. 5A, a first distinct petaloid 502 and a second distinct petaloid 504 may be identified by the server 180. Once each of the distinct petaloids is identified by the server 180, the server 180 may then determine which sets of distinct petaloids constitute a single package present on the pressure sensitive mat 120. In some embodiments, this determination may be made by the server 180 identifying a set of distinct petaloids within a threshold distance of each other. In this example, a package may be identified as the set of five distinct petaloids within a threshold number of pixels of each other. The distance between each of the distinct petaloids may be determined using any method, such as the minimum number of white pixels between each of the distinct petaloids, the minimum number of pixels between the center of mass of each of the distinct petaloids, or other such determination. In some embodiments, the server 180 may identify a set of distinct petaloids that constitute a single package as the set of petaloids that fit within a reference circle. Other methods of identifying a set of distinct petaloids that constitute a single package may be used.

FIG. 5B illustrates the pattern of pixels within the 2D image 150 for a package with a circular shaped shelf contact surface. The circular shape may be identified by a contiguous set of pixels with non-zero encoded pressure values (e.g., non-white pixels) that enclose a threshold number of pixels with a zero encoded pressure value (e.g., white pixels). Continuity between pixels may be based on any non-white pixels being present on any of the sides or diagonals of another non-white pixel. Other definitions of continuity may be used to define the circular shaped shelf contact surfaces such that the server 180 may process the 2D image 150 to identify packaging with a circular shaped shelf contact surface. In FIG. 5B, a circular shaped shelf contacting surface 506 may be detected by the server 180.

FIG. 5C illustrates the pattern of pixels within the 2D image 150 for a plurality of types and sizes of packages. For example, a first petaloid shaped shelf contacting surface of a first size 508 may be detected by the server 180. A first circular shaped shelf contacting surface of a first size 510 may be detected by the server 180. A first petaloid shaped shelf contacting surface of a second size 512 may be detected by the server 180. A second petaloid shaped shelf contacting surface of a second size 514 may be detected by the server 180. A second circular shaped shelf contacting surface of the first size 516 may be detected by the server 180. Accordingly, the server 180 may detect multiple types of beverage packaging of different sizes at the same time.

Once the shape of the packaging shelf contacting surface is determined, one or more dimensions and a total weight of the packaging may be determined. For example, the radius, diameter, circumference, surface area of contact (e.g., number of non-zero pixels in the set of pixels determined to constitute a single package) or other dimension of the packaging may be determined. In some embodiments, one or more dimensions of the packaging may first be determined in terms of numbers of pixels and then that value converted to a distance based on the known pressure sensor pitch on the pressure sensitive mat 120. For example, the radius may first be determined in terms of a number of pixels between a central pixel and an outermost pixel in the set of pixels determined to constitute a single package. The determined number of pixels for the radius may then be converted to a length for the radius based on the known pressure sensor pitch of the pressure sensitive mat 120. Other methods of determining the radius may be used. Any method of determining the above mentioned dimensions based on processing the 2D image may be used.

The 2D image 150 may be processed to determine a weight of a package determined to be present on the pressure sensitive mat 120. As discussed above, each pixel location encodes a pressure value corresponding to the weight of the packaging applied at that pixel location. By summing the pressure values of all of the pixels in the set of pixels determined to constitute a single package, a total weight of the package may be determined. Other methods of determining the weight of a package may be used.

Based on determining the shape of the shelf contacting surface of the package, the packaging type may be determined (e.g., a petaloid base corresponds to a plastic bottle package). Using one or more dimensions of the identified package, the size of the package may be determined (e.g., a plastic bottle with a 1 inch radius is a 20 fl. oz. bottle). Once the size of the bottle is determined, the type of beverage may be determined based on the weight of the package. For example, a cola beverage may have a first weight and a diet-cola beverage may have a second weight that is less than the first weight. The difference in weight may be due to the difference in the amount of dissolved solids in each of the brands of beverages.

Figure 5D:
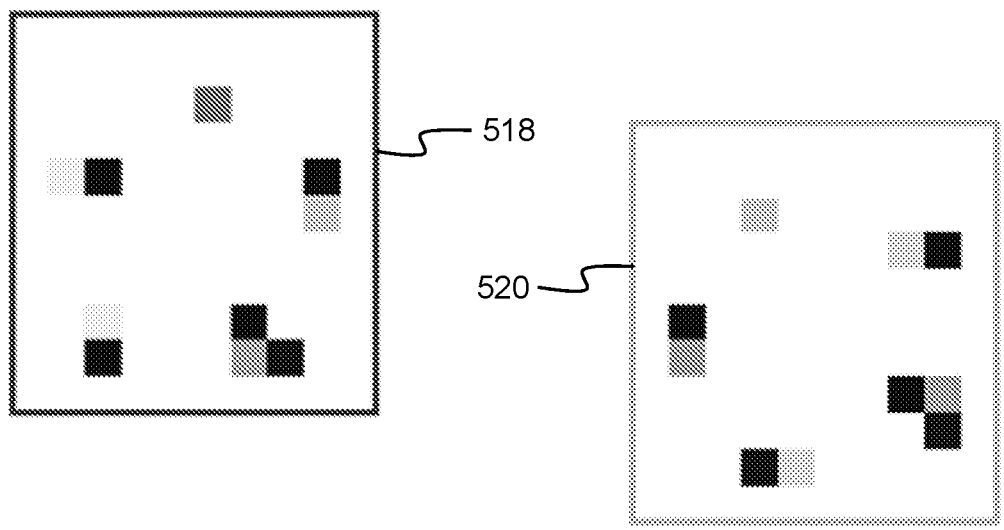

FIG. 5D illustrates the pattern of pixels within the 2D image 150 for a plurality of different beverages of the same type and size of packaging. For example, the server 180 may determine that the 2D image 150 has a first 20 fl. oz. plastic bottle 518 and a second 20 fl. oz. plastic bottle 520. Based on the difference in total weight of the bottles 518, 520, the server 180 may further determine that the bottle 518 is for a cola beverage, whereas the bottle 520 is for a diet-cola beverage.

Depending on the sensitivity of the pressure sensitive mat 120, in some instances knowing all of the packaging type, size, and weight may not be sufficient information to uniquely identify all types of beverages or other products. For example, the weight of a 20 fl. oz. plastic bottle of a cola beverage may be the same as the weight of a 20 fl. oz. plastic bottle of a lemon-lime beverage. Accordingly, the server 180 may access a planogram of the display shelving 110. The planogram may be stored in a database (not shown) on or accessible to the server 180. If there is agreement between the planogram and the determined packaging type, size, and weight of a packaged determined to be present on the pressure sensitive mat 120, then it may be deduced that the detected packaging is the type of beverage identified in the planogram. For example, if the server 180 determines that a package is a 20 fl. oz. plastic bottle with a weight indicative of either a cola beverage or a lemon-lime beverage, the server 180 may access a planogram corresponding to the display shelving 110. The planogram may indicate that 20 fl. oz. plastic bottles of a cola beverage should be at the location on the pressure sensitive mat 120 where the detected packaging is determined to be located. Accordingly, the server 180 may deduce based on the planogram and the detected packaging type, size, and weight that the beverage is a cola beverage.

Figure 6:
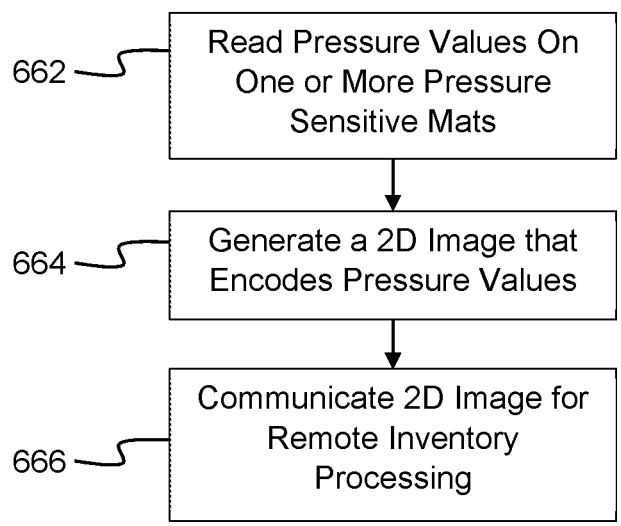
FIG. 6 is a flow diagram illustrating aspects of the operation of the local reader/processor, in one configuration presented herein.

FIG. 6 is a flow diagram illustrating aspects of the operation of the local reader/processor 140, in one configuration presented herein. At 662 the local reader/processor 140 reads the pressure values of the pressure sensors 310 on one or more pressure sensitive mats 120, 122, 123, 124. As discussed above, the local reader/processor 140 may read the pressure values on a scheduled basis or in response to a local or remote trigger.

At 664, the local reader/processor 140 generates a 2D image 150 that encodes the read pressure values. Each pressure value read from a pressure sensor on one of the pressure sensitive mats 120, 122, 123, 124 may be converted to a pixel value in the 2D image 150, where a grayscale or color value of the pixel in the 2D image encodes the pressure value from the pressure sensor of the corresponding pressure sensitive mat. Each pixel in the 2D image 150 also encodes the location of the pressure sensor on the corresponding pressure sensitive mat. Because the sensor pitch between adjacent pressure sensors 310 on the pressure sensitive mat 120 is known, the 2D image encodes the distance between pixels. In some embodiments, the local reader/processor 140 may generate a single image 150 for each mat. In some embodiments, the local reader/processor 140 may generate a single image 150 for each product detection zone. In some embodiments, the local reader/processor 140 may generate a single image 150 from multiple mats, such as an image for each shelf on a display shelving 110 or one image for the entire display shelving 110.

At 666, the local reader/processor 140 may communicate the 2D image 150 over a network 160 to the server 180 for processing. In some embodiments, the local reader/processor 140 may directly communicate the 2D image 150 over the network 160, such as via a cellular modem. In some embodiments, the local reader/processor 140 may communicate the 2D image to the gateway 250 in an outlet where the display shelving 110 is located. The gateway 250 may then communicate the 2D image over the network 160 to the server 180.

Figure 7:
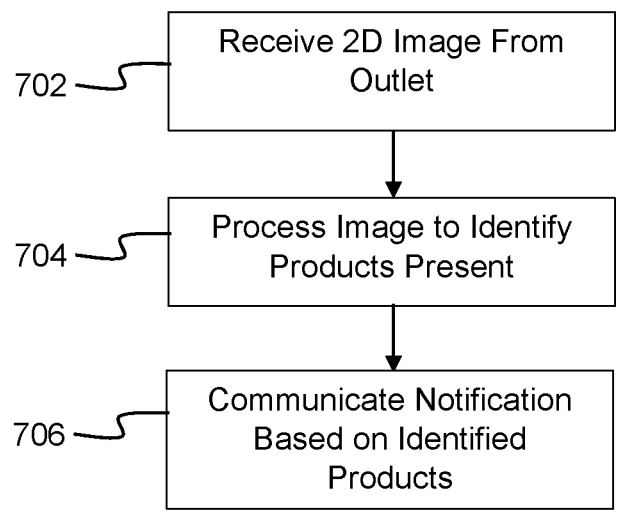
FIG. 7 is a flow diagram illustrating aspects of the operation of a server in the automatic inventorying system, in one configuration presented herein.

FIG. 7 is a flow diagram illustrating aspects of the operation of the server 180 in the automatic inventorying system, in one configuration presented herein. At 702, the server receives the 2D image 150 from the local reader/processor in the outlet with the display shelving 110. At 704, the server 180 processes the image to determine the packaging shape, one or more dimensions of the package, and the weight of the package for each of the packages determined to be present on the pressure sensitive mat 120, as discussed in detail above. The server 180 may use the determined shape and one or more dimensions of the packaging to identify the type and size of the packaging present on the pressure sensitive mat 120. Based on the determined packaging type, size, and weight, the server 180 may identify that one or more possible types of products are determined to be present on the pressure sensitive mat 120. The server 180 may also compare the one or more possible types of products determined to be present on the pressure sensitive mat 120 to a planogram of the display shelving 110 to deduce which products are present on the pressure sensitive mat 120.

At 706, the server 180 may then communicate a notification to an inventory management system 190 such that the correct amount of new inventory 192 is ordered and merchandised appropriately on the display shelving 110. For example, a notification 170 may be communicated over the network 160 to an outlet owner or manager or other entity responsible for the merchandising of products on the display shelving 110 to adjust the placement of products present on the pressure sensitive mats 120, 122, 123, 124. In this example, the notification 170 may remind the outlet owner or manager to ensure that the products in a sold-down location are moved towards the end of the shelf to be more visible and accessible to consumers and thus improve the continued sales of those products.

In another example, a notification 170 may be communicated over the network 160 to an outlet owner or manager or other entity responsible for ordering new inventory 192 of the amount of products sold. For example, the notification 170 may be communicated to an inventory management system 190, such that an order for new inventory 192 includes an appropriate amount of each product to restock the display shelving 110. In a non-limiting example, the server 180 may compare the current inventory of products determined to be present on the pressure sensitive mats 120, 122, 123, 124 to a planogram for the shelving display 110 to determine an amount of products needed to fill the shelving display 110 according to the planogram. The determined amount of products needed to fill the shelving display 110 according to the planogram may be communicated in the notification 170 such that an order may include the appropriate amount of each product.

Alternatively or in addition to the above, based on a determined consumption rate of products, a projected amount of sold inventory may be communicated in the notification 170 such that an order may include an appropriate amount of each product in the next projected new inventory 192 delivery. Alternatively or in addition to the projected amount of sold inventory, the notification 170 may also include the determined consumption rate. The notification 170 may also include other information, such as the 2D image(s) used to determine which products are present on the mats 120, 122, 123, 124, an indication of which products the server 180 determined were present, a total number of each type of product determined to be present on the mats 120, 122, 123, 124, or any other information received or used by the server 180.

It should be appreciated that in the examples used above beverages were used as the type of product, whereas the examples may be extended to any type of packaging and any type of product. Also, while the examples described above were based on the analysis of individual packages, it is contemplated that the systems and methods described herein may also be used with products enclosed in secondary packaging, such as a six pack or case of products. Similar to the examples above, the shape, size, and weight of the secondary packaging units may be used to identify one or more types of products that may be present which can then be compared to a planogram to deduce an individual type of product present on the pressure sensitive mat.

It should be appreciated that the logical operations described above with reference to FIGS. 1-7 may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 8:
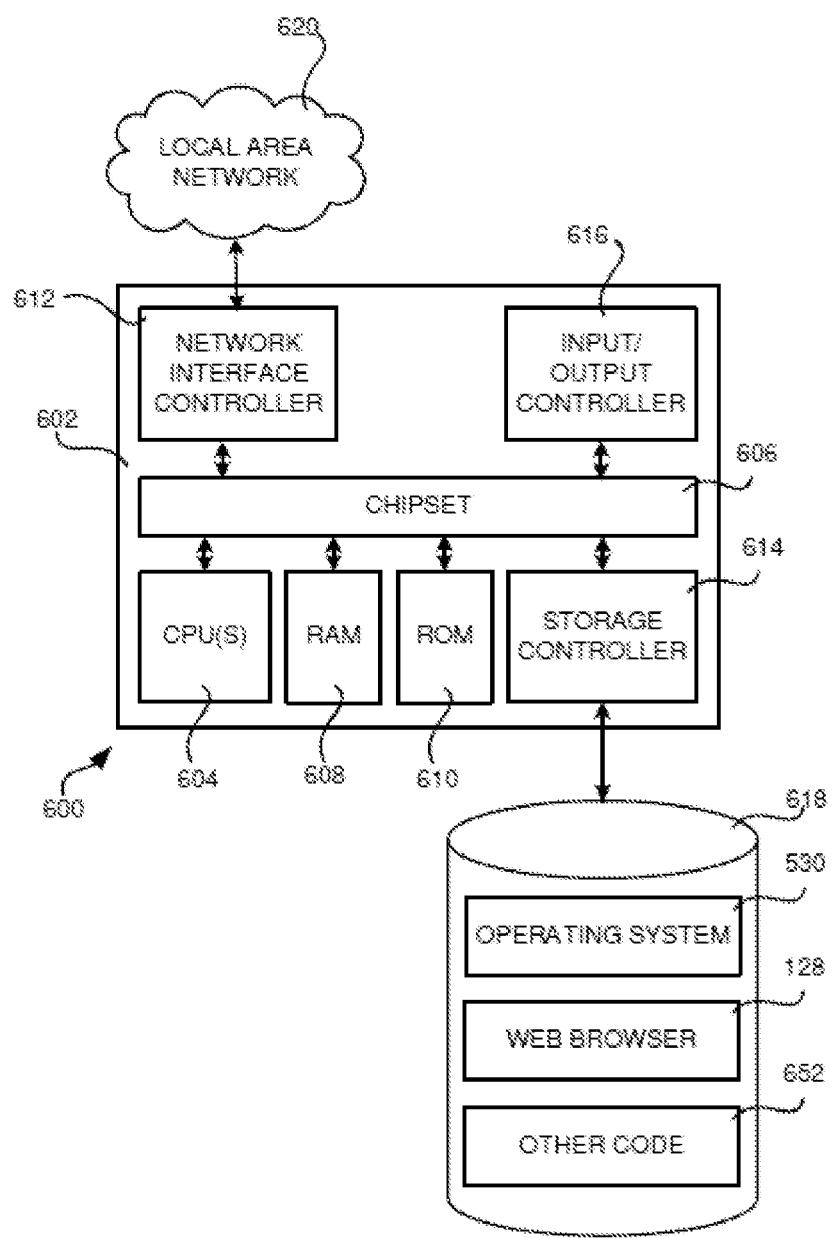
FIG. 8 is a computer architecture diagram showing an illustrative computer hardware architecture for implementing a computing device that might be utilized to implement aspects of the various technologies presented herein.

FIG. 8 shows an example computer architecture for a computer 600 capable of executing program components for implementing the various elements in the manner described above. The computer architecture shown in FIG. 6 illustrates a conventional server computer, workstation, desktop computer, laptop, tablet, network appliance, e-reader, smartphone, or other computing device, and may be utilized to execute any of the software components presented herein. For example, the computer architecture shown in FIG. 8 may be utilized to execute software components for providing the functions and features described with reference to FIGS. 1-7 and/or related functionality. The computer architecture shown in FIG. 8 might also be utilized to implement a server 180 or any other of the computing systems described herein, including inventory management system 190, etc.

The computer 600 includes a baseboard 602, or "motherboard," which is a printed circuit board to which a multitude of components or devices may be connected by way of a system bus or other electrical communication paths. In one illustrative configuration, one or more central processing units (CPUs) 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computer 600. The chipset 606 may further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM may also store other software components necessary for the operation of the computer 600 in accordance with the configurations described herein.

The computer 600 may operate in a networked environment using logical connections to remote computing devices and computer systems through a network, such as the local area network 620 or network 160. The chipset 606 may include functionality for providing network connectivity through a NIC 612, such as a gigabit Ethernet adapter. The NIC 612 is capable of connecting the computer 600 to other computing devices over the network 620. It should be appreciated that multiple NICs 612 may be present in the computer 600, connecting the computer to other types of networks and remote computer systems.

The computer 600 may be connected to a mass storage device 618 that provides non-volatile storage for the computer. The mass storage device 618 may store system programs, application programs, other program modules, and data, which have been described in greater detail herein. The mass storage device 618 may be connected to the computer 600 through a storage controller 614 connected to the chipset 606. The mass storage device 618 may consist of one or more physical storage units. The storage controller 614 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like.

For example, the computer 600 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular discrete component in a solid-state storage unit. Other transformations of physical media are possible without departing from the spirit and scope of the present description, with the foregoing examples provided only to facilitate this description. The computer 600 may further read information from the mass storage device 618 by detecting the physical states or characteristics of one or more particular locations within the physical storage units.

In addition to the mass storage device 618 described above, the computer 600 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 618 may store an operating system 530 utilized to control the operation of the computer 600. According to one configuration, the operating system includes at least one of the LINUX operating system, the WINDOWS® SERVER operating system from MICROSOFT Corporation, and the UNIX operating system or one of its variants. It should be appreciated that other operating systems may also be utilized. The mass storage device 618 may store other system or application programs and data utilized by the computer 600, such as one or more applications for carrying out the functions of the server 180, and/or any of the other software components and data described above. The mass storage device 618 might also store other programs and data 652 not specifically identified herein.

In one configuration, the mass storage device 618 or other computer-readable storage media is encoded with computer-executable instructions which, when loaded into the computer 600, transform the computer from a general-purpose computing system into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various routines described above with regard to FIGS. 1-7. The computer 600 might also include computer-readable storage media for performing any of the other computer-implemented operations described herein.

The computer 600 may also include one or more input/output controllers 616 for receiving and processing input from a number of input devices, such as a keyboard, a mouse, a touchpad, a touch screen, a capacitive input device, or other type of input device. Similarly, the input/output controller 616 may provide output to a display, such as a computer monitor, a flat-panel display, a digital projector, a printer, a plotter, or other type of output device. It will be appreciated that the computer 600 may not include all of the components shown in FIG. 8, may include other components that are not explicitly shown in FIG. 8, or may utilize an architecture completely different than that shown in FIG. 8.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully or partially automated via, software code modules executed by one or more general purpose computers or processors. The code modules may be stored in any type of computer-readable storage medium or other computer storage device. Some or all of the methods may additionally or alternatively be embodied in specialized computer hardware.

Conditional language such as, among others, "can," "could," or "may," unless specifically stated otherwise, means that certain examples include, while other examples do not include, certain features, elements and/or steps. Thus, such conditional language does not imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrases "and/or" and "at least one of X, Y or Z," unless specifically stated otherwise, mean that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   a pressure sensitive mat comprising:
   a grid of a plurality of pressure sensors;
   a grid of a plurality of holes through a thickness of the mat configured to facilitate air flow through the pressure sensitive mat to facilitate cooling of products placed upon the pressure sensitive mat; and
   a plurality of wire leads laid out around the plurality of holes;
   a local processor configured to read pressure values from the plurality of pressure sensors on the pressure sensitive mat and generate an image with each pixel in the image encoding a value corresponding to a pressure value read from the pressure sensitive mat; and
   a remote server configured to:
   receive the image from the local processor and process the image to create an estimate of one or more types of products corresponding to each product package detected to be present on the pressure sensitive mat based on a combination of two or more of:
   a shape of a bottom of the product package;
   one or more dimensions of the bottom of the product package;
   a weight of the product package; and
   deduce a unique product that is present on the pressure sensitive mat for each product package detected to be present on the pressure sensitive mat based on a comparison between the estimate and a planogram of a shelf where the pressure sensitive mat is located.

2. The system of claim 1, wherein the value of each pixel is encoded at a pixel location within the image corresponding to a corresponding pressure sensor location within the grid on the pressure sensitive mat.

3. The system of claim 1, wherein the local processor is configured to read the pressure values in response to a trigger or on a scheduled basis.

4. The system of claim 1, wherein the local processor is in direct communication with the pressure sensitive mat to read the pressure values.

5. The system of claim 1, wherein the local processor is further configured to communicate the image to the remote server over a network.

6. The system of claim 1, wherein the remote server is further configured to determine a type of the product package based on the shape of the product package.

7. The system of claim 1, wherein the one or more types of products are beverage products and the product package is a beverage package.

8. The system of claim 1, wherein the remote server is further configured to compare a current inventory of products determined to be present on the pressure sensitive mat to the planogram for the shelf where the pressure sensitive mat is located to determine an amount of products needed to fill the shelf according to the planogram.

9. The system of claim 1, wherein the remote server is further configured to communicate a notification to an inventory management system based on the identified products on the pressure sensitive mat.

* * * * *